July 28, 1953     R. J. THOMPSON     2,646,995

BRAZED JOINT WITH BACKING RING

Filed Sept. 10, 1948

*INVENTOR.*
ROLAND J. THOMPSON
BY
ATTORNEY

Patented July 28, 1953

2,646,995

UNITED STATES PATENT OFFICE 2,646,995

BRAZED JOINT WITH BACKING RING

Roland J. Thompson, Washington, D. C.

Application September 10, 1948, Serial No. 48,550

4 Claims. (Cl. 285—111)

(Granted under Title 35, U. S. Code (1952), sec. 266)

This invention relates to joints for pipes, sheets, bars, valves, fittings and the like with special application to welded joints having liners or backing rings.

The use of welded joints between separate plate or pipe elements is well known. To apply a strengthening liner in the areas of junction is also well known. However in either case defects develop due to the fact that the junction area between the parts is incomplete allowing leakage and resulting in areas of structural weakness. Also where liners are used the heat applied at welding expands the liner so as to develop obstructions to the normal flow of fluids in the pipe. In addition, in the usual methods of liner application preliminary tacking welds are considered necessary to prevent shifting of the same during the attachment steps but since only one end can be tacked distortions usually develop at the free end.

Generally stated the present invention comprises a joint between separate but adjoining pipe elements including a backing ring underlapping the junction line, the ring having sealing ends and an intermediate externally recessed surface area adapted to receive brazing material. Fusion of the brazing material results in a close band between the ring and both adjoining ends of the joint, which is impervious to fluids. By preformation of the bonding material as an insert in the ring recess, assurance of uniform bonding in the annular area of the joint is assured.

One of the main objects of the invention is, therefore, to provide a joint between separate elements which is uniform in the distribution of bonding material. Another object of the invention is to provide a joint in which the main bonding agent is supplemented by a secondary bonding agent, whereby leakage is substantially eliminated. A further object is the provision of a joint having an enlarged area of contact on both sides of the junction line at which bonding material is effective. An object also is the provision of a backing ring for joints which facilitates brazing in situ.

Additional objects are the provision of a backing ring for junctions of separated parts which maintains its position without displacement during the various joining steps and without formation of obstructions inside the joined pipe.

Figure 1:
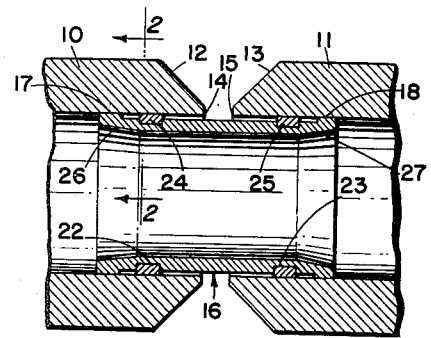
Figure 6:
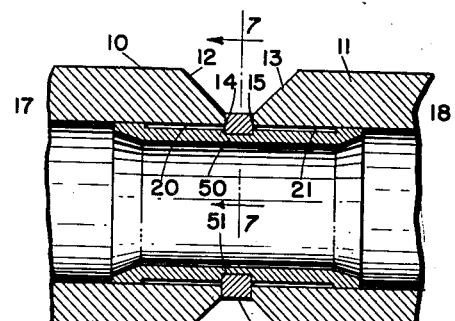
Figure 2:
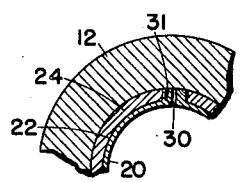
Figure 5:
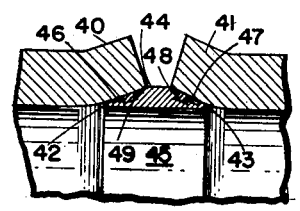
Figure 3:
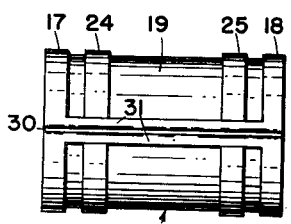
Figure 7:
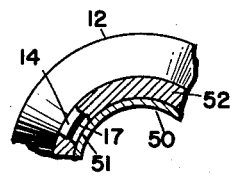
Figure 4:
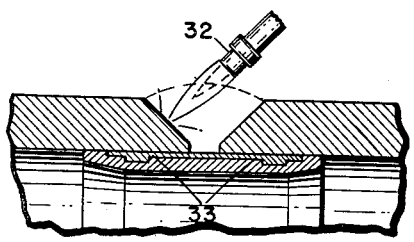
Figure 8:
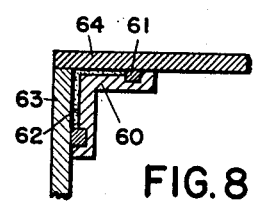

Other objects and many of the attendant advantages of this invention will be readily appreciated as the same becomes better understood by reference to the following detailed description when considered in connection with the accompanying drawings wherein: Fig. 1 is a sectional elevation of the joint as applied to pipe connections; Fig. 2 is a detail of a section along lines 2—2 of Fig. 1; Fig. 3 is a plain view of the backing ring; Fig. 4 is a detail showing in section the backing ring brazing step; Fig. 5 is a sectional detail showing a modification of the backing ring attachment to provide full pipe clearance; Fig. 6 is a view of a modified form of the invention; Fig. 7 is a detail taken along lines 7—7 of Fig. 6, and Fig. 8 is a detail showing the application of the joint to flat plates, as in a box joint.

In the showing of Fig. 1 the pipes are indicated by numerals 10 and 11, with adjoining tapered ends 12 and 13 terminating in truncated tips 14 and 15. Inserted in the pipe ends is the joining liner connector, or backing ring 16. This ring is shown as cylindrical with end sections 17 and 18 having outer diameters equal approximately to that of the inner diameter of the pipes.

The intermediate section 19 of the ring between the end sections 17 and 18 is reduced in diameter so that when the ring is placed with its end sections within the adjoining pipe ends, recesses 20 and 21 are formed between the ring surface and the pipe tubing.

Grooves 22 and 23 are cut externally on the inner section 19 of the ring at points adjacent the end sections, and in these grooves are fixed rings 24 and 25 of brazing or bonding material, such as silver, spelter or bronze alloys, which have adequate fluidity when heated to spread over the recess areas.

Internally, the backing ring is flared at either end as indicated at 26 and 27, to reduce the resistance to fluid flow in the pipe line.

The backing ring is split as at 30 (Fig. 3) to permit a spring fit within tube ends of varied inner diameters and to insure position retention in the preliminary assembly steps. As desired, the split may be a straight cut parallel to the ring axis as indicated in Fig. 3 or at an angle thereto, or the split may be S- or Z-shaped. Adjacent the split edges the ring is enlarged to the diameter of the end sections 17 and 18 as indicated at 31 in Fig. 3. In shape the backing ring is made to conform to the pipe tube formation and may be round, square, oval or any other desired shape.

In the assembly of the elements forming the joint, the backing ring, carrying the preformed brazing material, is inserted in the ducts of the pipe ends, to a point where brazing rings 24 and 25 are inside the pipe ends and the recesses 20 and 21 are formed.

On insertion of the backing ring there should be a separation between the tips 14 and 15 of the adjacent pipe ends to allow the arc weld step.

Heat as for example the torch flame 32 of Fig. 4 is applied to the region of the brazing rings, which fuse and flow under capillary action throughout the area of the recesses 20 and 21, the end sections 17 and 18 serving as end barriers to this flow. On solidification a tight joint results as shown at 33 in Fig. 4 which is leak-proof to the flux material of an arc weld and which moreover holds the backing ring at the proper point in relation to the pipe ends for sound arc welds.

On completion of the backing ring brazing operation the pipe ends may be arc welded in the usual manner. There is thus provided at the joint a primary band due to the arc weld and a secondary band due to the two brazed sections of the backing ring, on either side of the arc weld center. In this joint the backing ring is held symmetrically placed with reference to the pipe ends, and the ring edges are maintained free of extruded brazing material due to the end section barriers 17 and 18. Thus, development of obstructions causing turbulence in fluid flow is avoided.

Where it is important that the pipe be free of obstructions to avoid turbulence, the form of the backing ring or plate shown in Fig. 5 is desirable. In this modification the adjacent pipe ends 40 and 41 are flared outwardly at any desired angle and the outer end surfaces 42 and 43 of the ring 44 is similarly angled with reference to the ring and pipe axis. The inner ring surface 45 is formed with the same diameter as of the pipe while the outer end surfaces of the ring are recessed to form recesses 46 and 47 similar to the inner end surface of the ring 16 of Fig. 1. A ring 48 of brazing material is fitted in grooves 49 formed in the recesses 46 and 47. Fusion to bring about the preliminary bonding of ring 44 is accomplished as in the preferred form. Also arc welding to bridge the pipe gap and bind the pipe ends together is completed as in the preferred form.

In the modification of the invention illustrated in Figs. 6 and 7 instead of forming two slots in the inner section 19 adjacent the ends of the backing ring 50, a single slot 51 is cut at the center and in this slot is inserted a ring 52 of preformed brazing material. Preferably the radial thickness of the ring 52 is such as to provide an annular extension thereof between the pipe ends thus acting as a spacer for maintenance of pipe distance during the initial assembly operations prior to brazing.

In effecting the brazing step for the backing ring of this modification heat applied adjacent the brazing material fuses the same with the result that the flux enters the recessed areas 20 and 21 until stopped by the end sections 17 and 18. On solidification, a uniform seal and band is formed between pipe and ring which properly relates the pipe ends 12 and 13 for the primary weld step.

For purpose of simplicity in illustration, the drawings and description have been descriptive of joints usable with pipe tubing. It is apparent however that sheets, plates, rods and other articles may be joined using the principles described. For such uses instead of a backing ring a backing plate is employed as shown in Fig. 8 where the backing plate 60 is provided with bonding material 61. On fusion, this material establishes the bond indicated at 62 between box plates 63 and 64 and the backing plate 60. Also while the brazing material is secured in slots on the backing ring it may be otherwise embedded or affixed to the ring surface. Obviously, also, many modifications and variations of the present invention are possible in the light of the above teachings and it is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. A joint assembly including spaced ends of cylindrical members and a cylindrical backing ring having a pair of slightly raised ridges at either end thereof positioned in underlying relation to the ends of said members, the outer diameter of said ridges being substantially the same as the inner diameter of said members whereby to space the intermediate portion of said ring from said members to form a capillary concavity on the outside of said ring, said ring having an annular groove between said slightly raised end edges, brazing material originally in said groove and extending outwardly thereof for flowing into said cavity when fused, sealing said members to said ring, said ridges limiting dispersal of the brazing material, and said spaced ends of said cylindrical members being beveled to receive a welding material for bonding the spaced ends of the members and said ring together.

2. A backing member for a welded joint between spaced cylindrical pipe ends, consisting of a cylindrical tube having an outer cylindrical surface with outer slightly raised end edges positioned at end-portions thereof, said tube having an inner surface comprising an intermediate uniform cylindrical surface and beveled ends to promote fluid flow therethrough, said raised end edges being adapted to form an intermediate capillary bonding area between said tube and the inner surface to said pipe ends, said tube having an angular groove between said slightly raised end edges, and bonding material in said groove extending outwardly from said outer cylindrical sufrace, said raised end edges being adapted to limit the spread of said bonding material when fused.

3. A backing member for a welded joint between spaced cylindrical pipe ends comprising a cylindrical tube having an outer surface with outer slightly raised end edges positioned at end-portions thereof, said tube having an inner surface comprising an intermediate uniform cylindrical surface having beveled ends to promote fluid flow therethrough, said raised end edges being adapted to form an intermediate capillary bonding area between said tube and the inner surface of the pipes, said tube having a medially annular groove between said slightly raised end edges, and bonding material in said groove, said bonding material having an outside diameter in excess of the outside diameter of said slightly raised end edges and a width substantially equal to the desired spacing between said pipe ends, whereby the spacing of said ends of said pipes is determined by the thickness of said bonding material and said raised end edges are adapted to limit the spread of said bonding material when fused.

4. A backing member for welded joints between the spaced cylindrical pipe ends consisting of a cylindrical tube having an outer surface with outer slightly raised end edges positioned at the end-portions thereof, said tube having an inner surface comprising an intermediate uniform cylindrical surface and beveled ends to promote fluid flow therethrough, said raised end edges being adapted to form an intermediate capillary bonding area between the outer surface of said tube and the inner surface of said pipes, said tube having an annular groove in said outer surface near each of said raised end edges, and bonding material in said grooves extending outwardly from said outer surface, said raised end edges being adapted to limit the spread of said bonding material when fused.

ROLAND J. THOMPSON.

References Cited in the file of this patent

UNITED STATES PATENTS

| Number | Name | Date |
| --- | --- | --- |
| 1,758,569 | Trageser et al. | May 13, 1930 |
| 1,801,171 | Mueller | Apr. 14, 1931 |
| 1,810,825 | Furrer | June 16, 1931 |
| 1,878,829 | Crouch | Sept. 20, 1932 |
| 1,920,449 | Unke | Aug. 1, 1933 |
| 1,934,022 | Wiggins | Nov. 7, 1933 |
| 1,980,561 | Wagner | Nov. 13, 1934 |
| 1,990,077 | Kershaw | Feb. 5, 1935 |
| 2,003,488 | Hook | June 4, 1935 |
| 2,125,324 | Williams | Aug. 2, 1938 |
| 2,362,505 | Smith | Nov. 14, 1944 |
| 2,537,776 | Markl | Jan. 9, 1951 |

FOREIGN PATENTS

| Number | Country | Date |
| --- | --- | --- |
| 627,201 | Germany | Mar. 11, 1936 |